United States Patent
Tulpule et al.

(10) Patent No.: US 9,260,002 B2
(45) Date of Patent: Feb. 16, 2016

(54) ENGINE START SYSTEMS AND TECHNIQUE FOR HYBRID ELECTRIC VEHICLES

(71) Applicants: Pinak J. Tulpule, Columbus, IN (US); Mahesh M. Kumar, Columbus, IN (US)

(72) Inventors: Pinak J. Tulpule, Columbus, IN (US); Mahesh M. Kumar, Columbus, IN (US)

(73) Assignee: Cummins Inc., Columbus, IN (US)

( * ) Notice: Subject to any disclaimer, the term of this patent is extended or adjusted under 35 U.S.C. 154(b) by 291 days.

(21) Appl. No.: 13/626,280

(22) Filed: Sep. 25, 2012

(65) Prior Publication Data

US 2014/0088805 A1    Mar. 27, 2014

(51) Int. Cl.
| | |
|---|---|
| *B60W 20/00* | (2006.01) |
| *B60K 6/442* | (2007.10) |
| *B60W 10/02* | (2006.01) |
| *B60W 10/06* | (2006.01) |
| *B60W 10/08* | (2006.01) |
| *B60K 6/48* | (2007.10) |

(52) U.S. Cl.
CPC ............ *B60K 6/442* (2013.01); *B60W 10/02* (2013.01); *B60W 10/06* (2013.01); *B60W 10/08* (2013.01); *B60W 20/00* (2013.01); *B60W 20/40* (2013.01); *B60K 2006/4825* (2013.01); *B60W 2510/0638* (2013.01); *Y02T 10/6234* (2013.01); *Y02T 10/6286* (2013.01); *Y10T 477/26* (2015.01)

(58) Field of Classification Search
CPC ......................... B60W 20/102; B60W 20/40
See application file for complete search history.

(56) References Cited

U.S. PATENT DOCUMENTS

| | | | |
|---|---|---|---|
| 6,581,705 | B2 | 6/2003 | Phillips et al. |
| 7,059,435 | B2 | 6/2006 | Niki et al. |
| 7,160,225 | B2 | 1/2007 | Berger et al. |
| 7,207,919 | B2 | 4/2007 | Tsuneyoshi et al. |
| 7,370,715 | B2 | 5/2008 | Colvin et al. |
| 7,645,209 | B2 | 1/2010 | Dreibholz et al. |
| 7,770,676 | B2 | 8/2010 | Tenbrock et al. |
| 7,784,575 | B2 | 8/2010 | Yamanaka et al. |
| 7,896,114 | B2 | 3/2011 | Colvin et al. |
| 2002/0062183 | A1 | 5/2002 | Yamaguchi et al. |
| 2006/0169504 | A1 | 8/2006 | Oliver et al. |
| 2009/0145373 | A1 | 6/2009 | Davis et al. |
| 2011/0083918 | A1 | 4/2011 | Kshatriya |
| 2011/0230307 | A1 | 9/2011 | Seel |
| 2012/0226404 | A1 | 9/2012 | Leone |

(Continued)

FOREIGN PATENT DOCUMENTS

WO    WO 2012/053340    *    4/2012

OTHER PUBLICATIONS

International Search Report and Written Opinion, ISAUS, PCT/US2013/060603, Cummins Inc., Feb. 26, 2014, 12 pgs.

*Primary Examiner* — John R Olszewski
*Assistant Examiner* — James M McPherson
(74) *Attorney, Agent, or Firm* — Taft Stettinius & Hollister LLP (57) ABSTRACT

An engine starting system and technique for transitioning from an electric drive mode to a hybrid drive made in a hybrid electric vehicle is disclosed. In an electric drive mode the torque demand of the hybrid electric vehicle is met by an electromechanical device. The starting technique includes slipping a clutch between the engine and electromechanical device with the vehicle in the electric drive mode to rotate the engine, disengaging the clutch so that the engine is fueled to obtain a speed that approximates a speed of the electromechanical device, and engaging the clutch to couple the engine and the electromechanical device to the drive shaft to meet driver torque demand.

18 Claims, 4 Drawing Sheets

(56) References Cited

U.S. PATENT DOCUMENTS

2013/0035818 A1* 2/2013 Meitinger et al. .............. 701/22
2013/0261865 A1* 10/2013 Toki ................................ 701/22
2013/0297128 A1* 11/2013 Takamura et al. .............. 701/22

* cited by examiner

ENGINE START SYSTEMS AND TECHNIQUE FOR HYBRID ELECTRIC VEHICLES

BACKGROUND

Hybrid electric vehicles supplement the internal combustion engine power with one or more electric machines and selectively allocate demanded power to the engine and the electric machines during a drive cycle. These arrangements improve fuel economy and reduce emissions as compared to conventional power systems that solely rely on an internal combustion engine as a power source. The ability to maximize these benefits is a function of the allocation of the power split between the engine and the electric machines utilized to meet driver torque demand. For example, hybrid electric vehicles allow the engine to be shut down when the electric machines and stored energy are capable of meeting driver torque demand, and the engine can be automatically restarted when the available stored energy and/or torque demand requires operation of the engine. Hybrid electric vehicles also allow regenerative energy to be captured and stored or utilized immediately to power the electric machines to drive the vehicle. Furthermore, the engine and electric machines can be controlled to operate at points of highest efficiency during a drive cycle to minimize the use of fuel while meeting output torque requirements.

One problem encountered during a drive cycle of a hybrid electric vehicle involves transitioning from an electric drive mode in which driver torque demand is met solely by the electric machines to a hybrid drive mode in which driver torque demand is met by both the engine and the electric machines. While the electric machines can be employed to start the engine during this transition, the driver can feel a reduced torque at the wheels as torque from the electric machines is allocated to start the engine, or if the transmission is disengaged or slipped relative to the electric machines during engine starting. If the torque from the electric machines remains engaged to the drive wheels during starting of the engine, the driver may feel an increased torque at the wheels as the engine speed increases to meet the speed of the electric machines. Also, the vehicle can jerk during transition from the electric drive mode to the hybrid drive mode, which can be unsettling for the driver and impart undesirable loading to the drive train components. While various solutions have been proposed to address this problem, there remains a need for further technological advancements in this area.

SUMMARY

One embodiment of the application is a unique technique for transitioning a hybrid electric vehicle from an electric drive mode to a hybrid drive mode. In one application, the technique is employed in a parallel hybrid system.

In one embodiment, an engine starting system and technique for transitioning from an electric drive mode to a hybrid drive made in a hybrid electric vehicle is disclosed. In an electric drive mode the torque demand of the hybrid electric vehicle is met by at least one electromechanical device. The starting technique includes slipping a clutch between the engine and the electromechanical device with the vehicle in the electric drive mode to rotate the engine, disengaging the clutch so that the engine is fueled to obtain a speed that approximates the speed of the electromechanical device, and engaging the clutch to couple the engine and the electromechanical device to the drive shaft to meet driver torque demand.

Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
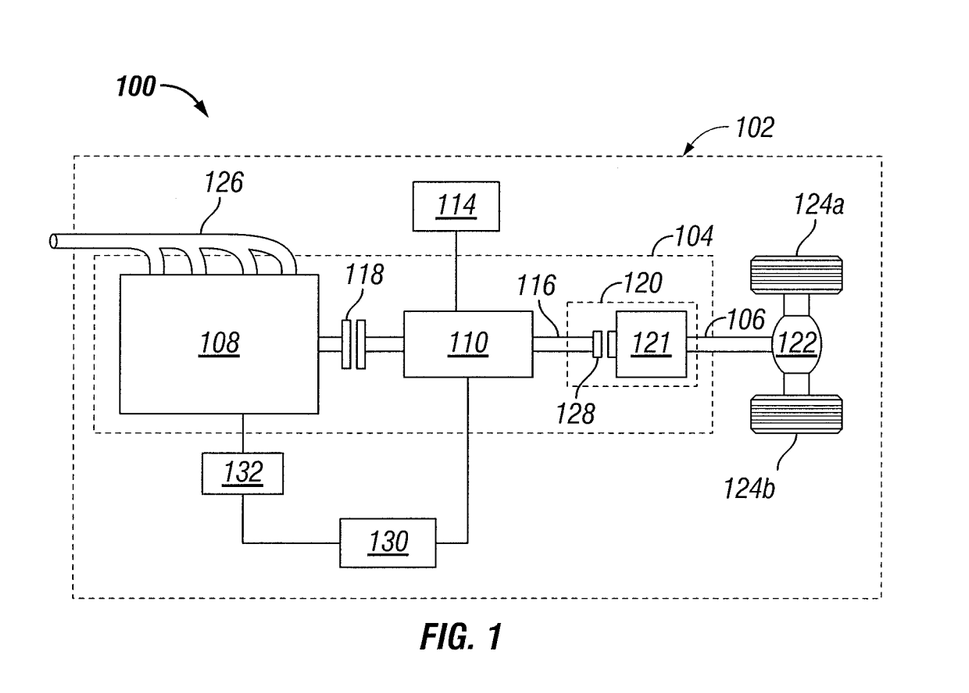
FIG. 1 is a schematic of one embodiment of a hybrid electric vehicle configuration.

Referencing FIG. 1, an exemplary system 100 includes a hybrid electric vehicle (HEV) 102 with a parallel hybrid system. HEV 102 includes a hybrid powertrain 104 having an internal combustion engine 108 with an exhaust 126 and an electromechanical device such as motor-generator (M/G) 110 coupled to an output shaft 116. The engine 108 may be any type of internal combustion engine known in the art. In some applications, the internal combustion engine 108 may be a diesel engine, although gasoline engines and engines that operate with any type of fuel are contemplated. In the example of FIG. 1, the engine 108 and M/G 110 are coupled to the drive shaft 106 through a transmission 120, and drive shaft 106 is engaged to a power splitter 122 to deliver drive torque to wheels 124a, 124b in response to a driver torque demand. Although only two wheels 124a, 124b are shown, it is contemplated that additional wheels may be provided with HEV 102, and that transmission 120 delivers drive torque to only one wheel or to more than one wheel.

The system 100 further includes an electric generator that is selectively coupled to the drive shaft 106 and further coupled to an electrical energy storage device 114. The electric generator in FIG. 1 is included with the M/G 110 as an electric motor/generator. As used herein, M/G refers to one or more electromechanical devices that each include a motor to provide torque to wheels 124a, 124b, and may include an electric generator in combination therewith or an electric generator may be provided as a separate device from the motor. Electrical energy storage device 114 is electrically connected to the M/G 110 to store electricity generated by the M/G 110 or, in other embodiments, is electrically connected to a generator that is a separate device. The electrical energy storage device 114 can be an electrochemical device such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 114 is contemplated herein, including a hyper-capacitor and/or an ultra-capacitor.

In certain embodiments, the system 100 includes the drive shaft 106 mechanically coupling the hybrid power train 104 to vehicle drive wheels 124*a*, 124*b*. Drive shaft 106 is connected to M/G 110 through shaft 116 extending between M/G 110 and transmission 120. In one embodiment, transmission 120 includes a gear box 121 and a first clutch 128 that drivingly engages shaft 116 of M/G 110 to drive shaft 106 through transmission 120. Clutch 128 can be provided with, for example, an automated manual transmission (AMT). In other embodiments, transmission 120 includes a manual clutch, or is an automatic transmission and does not include a clutch. Other embodiments contemplate any suitable coupling arrangement between M/G 110 and transmission 120, so long as M/G 110 is capable of transmitting drive torque to drive shaft 106. Engine 108 and M/G 110 are connected with a second clutch 118 that is selectively engageable to transmit drive torque produced by engine 108 to M/G 110 and/or to drive shaft 106 through shaft 116 and transmission 120, and to transmit torque from M/G 110 to engine 108.

The system 100 further includes a hybrid control module (HCM) 130 having modules structured to functionally execute operations for managing hybrid power train operation. HCM 130 is linked to M/G 110 and to engine 108 through engine control module (ECM) 132. In certain embodiments, HCM 130 and/or ECM 132 form a portion of a processing subsystem including one or more computing devices having memory, processing, and communication hardware. The HCM 130 and/or ECM 132 may be a single device or a distributed device, and the functions of the HCM 130 and ECM 132 may be performed by hardware or software in a combined controller or separate controllers.

The description herein including modules emphasizes the structural independence of the aspects of HCM 130, and illustrates one grouping of operations and responsibilities of the HCM 130. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
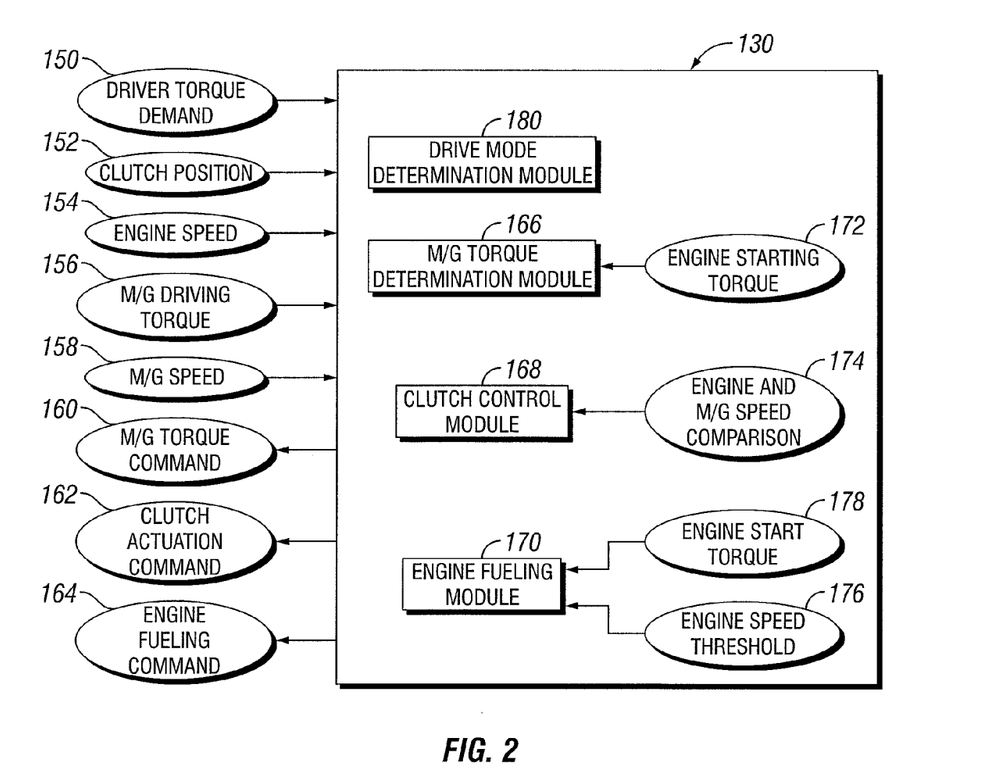
FIG. 2 is a schematic view of a controller that functionally executes certain operations for transitioning a hybrid electric vehicle from an electric drive mode to a hybrid drive mode.

FIG. 2 is a schematic view of a part of a controller apparatus such as HCM 130 for starting engine 108 when the HEV 102 is in an electric drive mode. The exemplary HCM 130 includes a drive mode determination module 180, an electromechanical device (M/G) torque determination module 166, a clutch control module 168, and an engine fueling module 170. Each of the modules 166, 168, 170, 180 provides specific commands to control operation of engine 108, M/G 110 and/ or clutch 118 depending on a drive mode dictated by drive mode determination module 180. Specific embodiments of the HCM 130 may omit certain modules or have additional modules, as will be understood by the description herein and the claims following.

The HCM 130 includes drive mode determination module 180 that determines a drive mode of the HEV 102. The drive mode determination module interprets operational parameters of system 100 to determine how to meet driver torque demand by the output torque from any one or combination of the powertrain components such as engine 108, M/G 110 and energy storage device 114. The output torque to be supplied from the powertrain components is determined by a power-split algorithm that allows HCM 130 to control operation of these components in a manner that achieves an operational goal over a drive cycle. These operational goals may include any one or combination of the following: achieving desired fuel efficiency, maintaining a state-of-charge of energy storage device 114, achieving a desired emissions level, operating components at highest efficiencies, recapturing energy, and maintaining an operational integrity of the components.

In the present application, drive mode determination module 180 determines a transition from an electric drive mode to a hybrid drive mode according to the power-split algorithm. In an electric drive mode driver torque demand 150 is satisfied by an output torque from M/G 110 with energy from energy storage device 114. All or a portion of the output torque from M/G 110 is provided to drive shaft 106 to rotate drive wheels 124*a*, 124*b*. In a hybrid drive mode, driver torque demand 150 is satisfied by an output torque from M/G 110 and from engine 108.

The HCM 130 includes M/G torque determination module 166 that interprets a driver torque demand 150, an M/G driving torque 156, and an engine starting torque 172 to determine an M/G torque command 160. Driver torque demand 150 is the output torque of the hybrid power train system demanded by the driver and/or other systems of the HEV. In one embodiment, driver torque demand 150 is determined at least by accelerator position. Driver torque demand may also include output torque required to operate one or more accessories of the vehicle, such as compressors, pumps, air conditioning systems, heating systems, compressed air systems, pulley systems, and hydraulic systems, for example.

M/G driving torque 156 is the amount of driving torque that M/G 110 supplies to wheels 124*a*, 124*b* through drive shaft 106 and, in some embodiments, accessories of HEV 102. When drive mode determination module 180 indicates an electric drive mode, M/G 110 receives an M/G torque command 160 that generates sufficient output torque so that M/G driving torque 156 satisfies driver torque demand 150. When drive mode determination module 180 indicates a hybrid drive mode, the power split to meet driver torque demand 150 requires operation of engine 108 and M/G 110. In the transition from an electric drive mode to a hybrid drive mode, engine 108 needs to be started since its speed may be 0 when the HEV 102 is in the electric drive mode. Engine starting torque 172 is the amount of output torque to be supplied from M/G 110 for starting engine 108 when engine speed is 0. When transitioning to the hybrid drive mode, M/G torque command 160 is the total torque required to be generated by M/G 110 in order to start engine 108 from the electric drive mode while M/G 110 supplies sufficient output torque to meet driver torque demand 150 without contribution of output torque from engine 108. When drive mode determination 108 indicates a hybrid drive mode, M/G torque demand 160 is the output torque required to be generated by M/G 110 to supplement or to be supplemented by the output torque supplied by engine 108 to meet drive torque demand 150.

The HCM 130 also includes a clutch control module 168 that interprets a clutch position 152, an engine speed 154, an M/G speed 158, and a comparison of engine and M/G speed 174 to determine a clutch actuation command 162. When drive mode determination module 180 indicates an electric drive mode, clutch actuation command 162 provides a clutch position 152 that is open or disengaged so that engine 108 is decoupled from M/G 110 and drive shaft 106. When drive mode determination module 180 indicates a hybrid drive mode, clutch actuation command 162 provides a clutch position 152 that is closed or engaged so that engine 108 is coupled to drive shaft 106 through M/G 110 and operable to supply torque to wheels 124a, 124b to meet driver torque demand 150 in conjunction with M/G 110. When drive mode determination module 180 indicates engine starting is required to transition between the electric drive mode and hybrid drive mode, clutch actuation command 162 provides a clutch position 152 that is slipping so that a portion of the torque from M/G 110 is provided to start engine 108 after the M/G torque command 160 increases the M/G output torque for engine starting. When in slipping engagement, the contact between the friction plates of clutch 118 is controlled so that the output shaft of engine 108 is not initially engaged at the full current operating speed of M/G 110. This allows engine 108 to be rotated at a slower speed than the current operating speed of M/G 110 since the clutch plates slip relative to one another.

When starting engine 108 from 0 speed, M/G torque command 160 increases the output torque of M/G 110 to provided sufficient extra torque for rotating engine 108 while meeting driver torque demand 150 with M/G 110. Clutch control module 168 provides a clutch actuation command 162 to slippingly engage clutch 118 so that torque is provided from M/G 110 to start rotating engine 108. When engine speed 154 is determined to reach a threshold starting speed, clutch control module 168 provides a clutch control command 162 to open clutch 118 and decouple the rotating engine 108 from M/G 110. When engine speed 154 is subsequently sufficiently close to M/G speed 158 as determined by engine and M/G speed comparison 174, clutch control module 168 provides a clutch actuation command 162 to close or engage clutch 118 so that engine 108 and M/G 110 operate together in the hybrid drive mode.

HCM 130 also includes an engine fueling module 170 that interprets clutch position 152, engine speed 154, M/G speed 158, an engine speed threshold 176, and an engine start torque 178 to determine an engine fueling command 164. In the electric drive mode, the engine fueling command 164 provides no fuel to engine 108 to increase fuel economy. When drive mode determination module 180 indicates an engine start is required to transition to a hybrid drive mode, engine 108 is rotated by increasing the output torque of M/G 110 and slipping clutch 118 to start rotating engine 108 without fueling engine 108. When engine speed 154 meets a first engine speed threshold 176, clutch actuation command 162 opens clutch 118 and then engine fueling module 170 provides an engine fueling command 164 to start fueling engine 108. An engine start torque 178 is interpreted to determine a fueling rate that increases engine speed to a second engine speed threshold 178 that closely approximates M/G speed 158. Once engine 108 is fueled and rotating with sufficient speed to operate in the hybrid drive mode, clutch control module 168 provides a clutch actuation command 162 to close clutch 118 and couple engine 108 with M/G 110 and drive shaft 106 as discussed above. When drive mode determination module 180 indicates a hybrid drive mode, engine fueling model 170 generates an engine fueling command 164 that allows engine 108 to provide sufficient torque in conjunction with torque from M/G 110 to meet driver torque demand 150 according to the power split algorithm.

Figure 3:
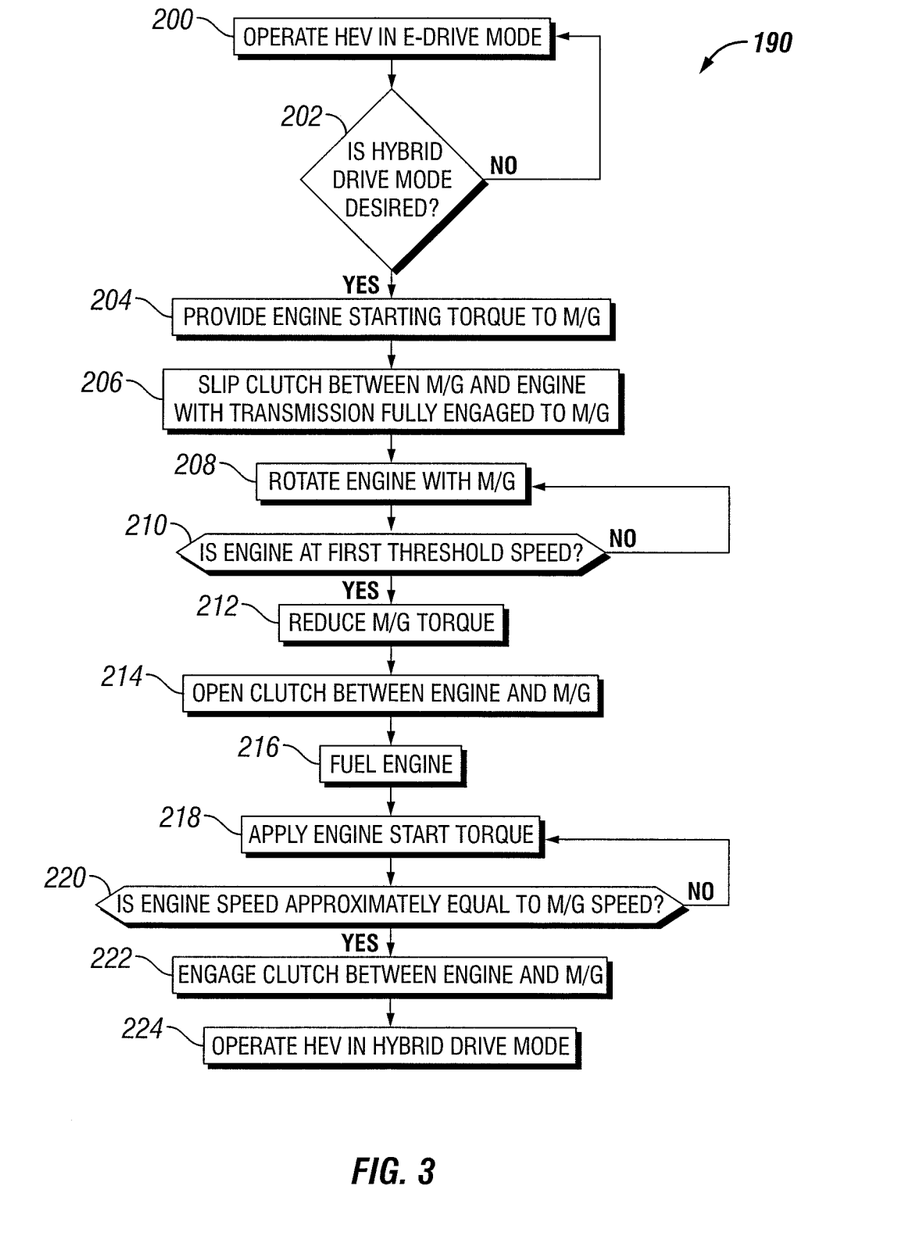
FIG. 3 is a schematic flow diagram of a procedure for transitioning a hybrid electric vehicle from an electric drive mode to a hybrid drive mode.

Referring further to FIG. 3, an exemplary procedure 190 is disclosed for starting engine 108 to transition from an electric drive mode to a hybrid drive mode. The operational descriptions which follow provide illustrative embodiments of performing procedures for managing hybrid power train operation. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable, non-transitory medium, where the computer program product comprises instructions causing the computer to execute one or more of the operations, or to issue commands to other devices to execute one or more of the operations.

The procedure 190 begins at operational 200 where the HEV is operated in an electric drive mode. At conditional 202 it is determined whether to continue operation in an electric drive mode, in which case operation continues at operational 200, or to transition to a hybrid drive mode. If transitioning to a hybrid drive mode is desired, then procedure 190 continues at operational 204 where the engine starting torque required for starting the engine 108 from a 0 speed is added to the output torque generated by M/G 110 in the electric drive mode. Procedure 190 continues at operational 206 where clutch 118 is slippingly engaged to couple engine 108 with M/G 110 while M/G 110 operates at its increased torque output. At operational 208 the increase in the torque output rotates engine 108 with slipping clutch 118 to enable a start of engine 108 without a loss of output torque delivered to drive wheels 124a, 124b.

Conditional 210 queries whether engine 108 has reached a first threshold speed such that engine 108 will start if fuel is supplied thereto. If conditional 210 is negative, then procedure 190 returns to operational 208 to continue to rotate engine 108 to obtain a first threshold speed. If conditional 210 is affirmative, procedure 190 continues at operational 212 where the output torque of M/G 110 is reduced to eliminate the engine starting torque while providing sufficient output torque to satisfy driver torque demand. After the torque reduction of M/G 110, clutch 118 is opened at operational 214 to decouple the rotating engine 108 from M/G 110. At operational 216 fuel is supplied to the rotating engine 108 to maintain engine 108 in a started condition while decoupled from M/G 110. An engine start torque is applied at operational 218 to increase the engine speed to a second engine speed threshold that approximates the speed of M/G 110.

At conditional 220 it is determined whether the engine speed and the speed of M/G 110 are sufficiently close or approximately equal so that engine 110 can be coupled to M/G 110 without a sudden jerk or impact from engaging components of mismatched speeds. If the relative speed threshold is not met at conditional 220, procedure 190 continues at operational 218 where fueling is increased to apply engine start torque and increase engine speed. If conditional 220 is positive, then clutch 118 is closed or engaged at operational 222 to couple engine 108 with M/G 110 and drive shaft 106. The HEV 102 is then operating in the hybrid drive mode at 224.

Figure 4A:
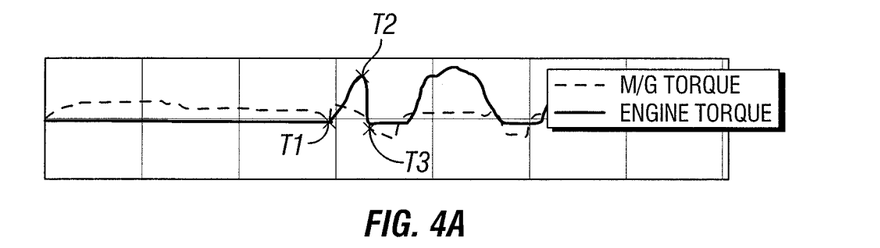
FIGS. 4a-4d are graphs showing how various parameters of the hybrid electric vehicle change over time during a transition from an electric drive mode to a hybrid drive mode.
Figure 4B:
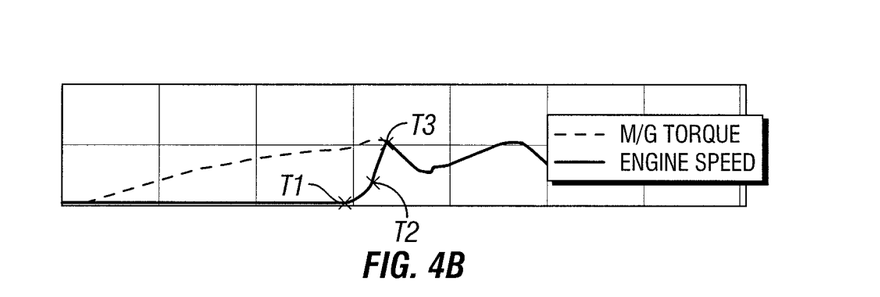
Figure 4C:
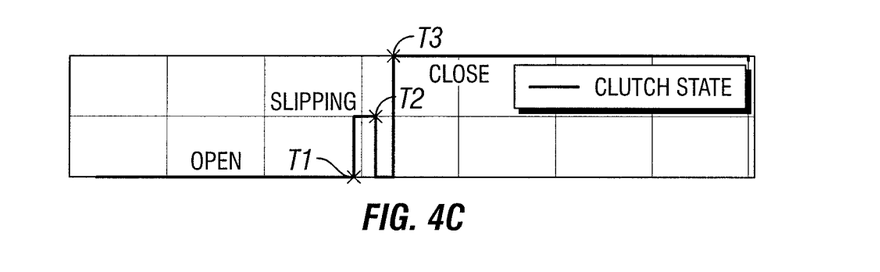
Figure 4D:
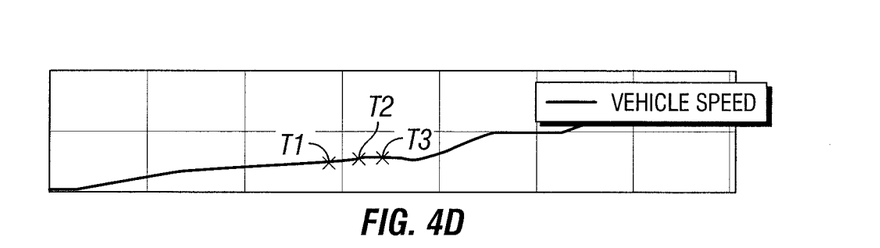

FIGS. 4A-4D are graphs showing how various quantities in the hybrid electric vehicle change over a period of time that includes a transition from an electric drive mode to a hybrid drive mode. FIG. 4A shows the M/G torque and the engine torque over the period of time. FIG. 4B shows the M/G speed and engine speed over the period of time. FIG. 4C shows the clutch state over the period of time. FIG. 4D shows the speed of the HEV 102 over the period of time.

Prior to time T1 engine 108 has 0 speed and HEV 102 is operating in an electric drive mode to satisfy driver torque demand. At time T1 a transition to a hybrid drive mode is initiated with clutch 118 in slipping engagement to provide a starting torque to rotate engine 108 with M/G 110. At time T1, engine speed and output torque are 0. From time T1 to time T2 with clutch 118 in slipping engagement, the rotational speed of engine 108 increases to a first threshold speed while M/G continues to provide sufficient output torque to maintain vehicle speed, meet driver torque demand and rotate the engine 108. At time T2 clutch 118 is opened to decouple the rotating engine 108 from M/G 110. During the time period from T2 to T3 after opening of clutch 118 at time T2, engine 108 is fueled to increase engine speed until a second threshold speed is obtained that is within predetermined limits of matching the speed of M/G 110. At time T3 the engine speed closely approximates and/or is synchronized with the M/G speed and the hybrid drive mode is established by fully engaging clutch 118 to couple engine 108 with M/G 110. In the hybrid drive mode, engine 108 and M/G 110 both provide output torque to wheels 124a, 124b to meet driver torque demand.

As shown in FIG. 4D, the speed of HEV 102 remains substantially constant or steady during the transition such that the transition is relatively unnoticeable in feel to the driver since torque oscillations at drive wheels 124a, 124b are minimized. The techniques, methods and systems disclosed herein allow transition from an electric drive mode to a hybrid drive mode even at high M/G speeds with the M/G fully engaged to the drive shaft through the transmission since the starting torque for the engine is provided by increasing the output torque from the M/G, slippingly engaging the clutch to rotate the engine, and then decoupling the engine from the M/G until the speeds of the engine and M/G are synchronized before fully engaging the engine to establish a hybrid drive mode. As a result, smoother vehicle operation is obtained along with more opportunities to recapture energy and to utilize the electric drive mode over a drive cycle and therefore increase fuel economy.

It is understood that, during transient events or at certain operating conditions, the engine 108, M/G 110, and/or clutch 118 and other electrical and mechanical energy devices and the mechanical systems may be unable to achieve the instantaneous response required to change operating conditions at precise intervals and/or at specific speeds, torques and timing. In certain embodiments, operations of the HCM 130 smooth the torque response or limit the torque outputs of engine 108 and M/G 110 and engagement of clutch 118 to physically realizable limits, such that the conditions which define the transition from an electric drive mode to a hybrid drive mode may be exceeded or not met over a brief period of operation. Nevertheless, these operations are understood to be operations to transition from the electric drive mode to the hybrid drive mode.

As is evident from the figures and text presented above, a variety of aspects of the engine starting techniques for a hybrid electric vehicle are contemplated. In one aspect a method comprises: operating a hybrid electric vehicle in an electric drive mode wherein a driver torque demand is satisfied by a torque output from an electromechanical device to a drive shaft; transitioning from the electric drive mode to a hybrid drive mode by slippingly engaging a friction clutch connecting the electromechanical device to an internal combustion engine to rotate the internal combustion engine; disengaging the friction clutch when a speed of the internal combustion engine reaches a first threshold; fueling the internal combustion engine after disengaging the friction clutch to increase the speed of the internal combustion engine to a second threshold; and when the speed of the internal combustion engine reaches the second threshold, operating the hybrid electric vehicle in a hybrid drive mode by engaging the friction clutch to couple the torque outputs of the internal combustion engine and the electromechanical device to the drive shaft.

In one embodiment of the method, the electrical device is a motor-generator. In another embodiment, the method includes increasing the torque output of the electromechanical device by an engine starting torque prior to transitioning from the electric drive mode to the hybrid drive mode while meeting driver torque demand with the electromechanical device. In one refinement of this embodiment, after increasing the torque output of the electromechanical device by the engine starting torque and before disengaging the friction clutch, reducing the output torque of the electromechanical device to satisfy the driver torque demand when the speed of the internal combustion engine reaches the first threshold.

In another embodiment of the method, the electromechanical device is coupled to the drive shaft with a transmission and the method includes satisfying driver torque demand with the electromechanical device while engaged with the transmission to transit the torque output from the electromechanical device to the drive shaft and slippingly engaging the friction clutch while the electromechanical device remains in driving engagement with the transmission. In a refinement of this embodiment, the transmission is an automated manual transmission. In another embodiment, the method includes applying an engine start torque while fueling the internal combustion engine to increase the speed of the internal combustion engine to the second threshold. In a further embodiment of the method, the speed of the internal combustion engine at the second threshold is approximately equal to the speed of the electromechanical device. In another embodiment, the method includes meeting driver torque demand with the torque output from the electromechanical device while fueling the internal combustion engine after disengaging the friction clutch to increase the speed of the internal combustion engine to the second threshold.

In another aspect, a method comprises operating a hybrid electric vehicle in an electric drive mode with an electromechanical device satisfying a driver torque demand. While in the electric drive mode, the method includes increasing a torque output of the electromechanical device to include an engine starting torque in addition to a torque output that satisfies the driver torque demand; slippingly engaging a clutch between the electromechanical device and an internal combustion engine to rotate the internal combustion engine with the engine starting torque from the electromechanical device; disengaging the clutch when the speed of the engine reaches a first threshold; fueling the engine to increase the speed of the engine while the clutch is disengaged; and engaging the clutch to couple the engine and the electromechanical device when the engine speed is approximately equal to a speed of the electromechanical device to satisfy driver torque demand in a hybrid drive mode.

In one embodiment of the method, after increasing the torque output of the electromechanical device to include the engine starting torque and the engine reaches the first threshold, the method further includes reducing the output torque of the electromechanical device to an output torque that satisfies the driver torque demand before disengaging the clutch.

According to another aspect, a system includes a powertrain including an internal combustion engine and an electromechanical device selectively coupled to one another with a friction clutch. The internal combustion engine and the electromechanical device are each operable to satisfy a driver torque demand. The system also includes a controller in communication with the internal combustion engine and the electromechanical device is configured to transition the powertrain from an electric drive mode where driver torque demand is satisfied by a torque output of the electromechanical device to a hybrid drive mode where driver torque demand is satisfied by a combined torque output of the electromechanical device and internal combustion engine. The controller includes an electromechanical device torque determination module configured to provide an electromechanical device torque command, a clutch control module configured to provide a clutch actuation command, and a drive mode determination module configured to determine a transition from the electric drive mode to the hybrid drive mode. During the transition from the electric drive mode to the hybrid drive mode, the electromechanical device is responsive to the electromechanical device torque command to increase the output torque of the electromechanical device to include an engine starting torque in addition to a torque output that satisfies the driver torque demand, the friction clutch is responsive to the clutch actuation command to slippingly engage the friction clutch to rotate the engine with the engine starting torque from the electromechanical device while the electromechanical device satisfies the driver torque demand, the friction clutch is further responsive to the clutch actuation command to disengage the friction clutch when the engine speed has reached a first threshold speed while satisfying driver torque demand with the electromechanical device, and the friction clutch is responsive to the clutch actuation command to engage the friction clutch to establish the hybrid drive mode when the engine speed has reached a second threshold speed.

In one embodiment of the system, the electromechanical device torque determination module is configured to interpret the driver torque demand and the engine starting torque to provide the electromechanical device torque command. In another embodiment of the system, the clutch control module is configured to interpret a clutch position, the engine speed, and an electromechanical device speed to provide the clutch actuation command. In a further embodiment, the system further comprises an engine fueling module configured to interpret an engine start torque and provide an engine fueling command to increase the speed of the internal combustion engine to the second threshold speed after the friction clutch is disengaged when the engine speed has reached the first threshold speed.

In another embodiment of the system, the electromechanical device is operable to satisfy the driver torque demand while slippingly engaging the friction clutch to rotate the engine with the engine starting torque from the electromechanical device. In a further embodiment, the second threshold speed is approximately equal to a speed of the electromechanical device. In another embodiment, the internal combustion engine is a diesel engine and the electromechanical device is a motor/generator. In yet another embodiment, the electrical device is operably coupled to an electrical energy storage device; and the powertrain includes a transmission that drivingly engages the electromechanical device to a drive shaft. In a refinement of this embodiment, the transmission is an automated manual transmission.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating a hybrid electric vehicle in an electric drive mode wherein a driver torque demand is satisfied by a torque output from an electromechanical device to a drive shaft and the electromechanical device is engaged to a transmission through the drive shaft;
   increasing the torque output of the electromechanical device by an engine starting torque prior to transitioning from the electric drive mode to the hybrid drive mode while the electromechanical device remains fully engaged to the transmission to meet driver torque demand with the electromechanical device during starting of the internal combustion engine;
   transitioning from the electric drive mode to a hybrid drive mode by slippingly engaging a friction clutch connecting the electromechanical device to the internal combustion engine to rotate the internal combustion engine while the electromechanical device remains fully engaged with the transmission to satisfy the driver torque demand;
   disengaging the friction clutch when a speed of the internal combustion engine reaches a first threshold;
   fueling the internal combustion engine after disengaging the friction clutch to increase the speed of the internal combustion engine to a second threshold; and
   when the speed of the internal combustion engine reaches the second threshold, operating the hybrid electric vehicle in a hybrid drive mode by engaging the friction clutch to couple a torque output of the internal combustion engine and the torque output of the electromechanical device to the drive shaft.

2. The method of claim 1, wherein the electrical device is a motor-generator.

3. The method of claim 1, after increasing the torque output of the electromechanical device by the engine starting torque and before disengaging the friction clutch, further comprising reducing the output torque of the electromechanical device to satisfy the driver torque demand when the speed of the internal combustion engine reaches the first threshold.

4. The method of claim 1, wherein the transmission is an automated manual transmission.

5. The method of claim 1, further comprising applying the engine starting torque while fueling the internal combustion engine to increase the speed of the internal combustion engine to the second threshold.

6. The method of claim 1, wherein the speed of the internal combustion engine at the second threshold is approximately equal to the speed of the electromechanical device.

7. The method of claim 1, further comprising meeting driver torque demand with the torque output from the electromechanical device while fueling the internal combustion engine after disengaging the friction clutch to increase the speed of the internal combustion engine to the second threshold.

8. A method, comprising:
operating a hybrid electric vehicle in an electric drive mode with an electromechanical device satisfying a driver torque demand, and while in the electric drive mode:
increasing a torque output of the electromechanical device to include an engine starting torque in addition to a torque output that satisfies the driver torque demand while the electromechanical device is fully engaged to a transmission of the hybrid electric vehicle to satisfy the driver torque demand;
after increasing the torque output, slippingly engaging a clutch between the electromechanical device and an internal combustion engine to rotate the internal combustion engine with the engine starting torque from the electromechanical device while the electromechanical device remains fully engaged to the transmission to satisfy the driver torque demand during starting of the internal combustion engine;
disengaging the clutch when the speed of the engine reaches a first threshold;
fueling the engine to increase the speed of the engine while the clutch is disengaged; and
engaging the clutch to couple the engine and the electromechanical device when the engine speed is approximately equal to a speed of the electromechanical device to satisfy driver torque demand in a hybrid drive mode.

9. The method of claim 8, after increasing the torque output of the electromechanical device to include the engine starting torque and the engine reaches the first threshold, further comprising reducing the output torque of the electromechanical device to an output torque that satisfies the driver torque demand before disengaging the clutch.

10. A system, comprising:
a powertrain including an internal combustion engine and an electromechanical device selectively coupled to one another with a friction clutch, wherein the internal combustion engine and the electromechanical device are each operable to satisfy a driver torque demand by providing a torque input to a transmission n of the powertrain;
a controller in communication with the internal combustion engine and the electromechanical device configured to transition the powertrain from an electric drive mode where driver torque demand is satisfied by a torque output of the electromechanical device to a hybrid drive mode where driver torque demand is satisfied by a combined torque output of the electromechanical device and the internal combustion engine, the controller further comprising:
an electromechanical device torque determination module configured to provide an electromechanical device torque command;
a clutch control module configured to provide a clutch actuation command;
a drive mode determination module configured to determine a transition from the electric drive mode to the hybrid drive mode;
wherein during the transition from the electric drive mode to the hybrid drive mode:
the electromechanical device is responsive to the electromechanical device torque command to increase the output torque of the electromechanical device while the electromechanical device is fully engaged to the transmission to include an engine starting torque in addition to a torque output that satisfies the driver torque demand;
the friction clutch is responsive to the clutch actuation command to slippingly engage the friction clutch after the torque output is increased to include the engine starting torque to rotate the engine with the engine starting torque from the electromechanical device while the electromechanical device remains fully engaged to the transmission to satisfy the driver torque demand during starting of the internal combustion engine;
the friction clutch is further responsive to the clutch actuation command to disengage the friction clutch when the engine speed has reached a first threshold speed while satisfying driver torque demand with the electromechanical device; and
the friction clutch is responsive to the clutch actuation command to engage the friction clutch to establish the hybrid drive mode when the engine speed has reached a second threshold speed.

11. The system of claim 10, wherein the electromechanical device torque determination module is configured to interpret the driver torque demand and the engine starting torque to provide the electromechanical device torque command.

12. The system of claim 10, wherein the clutch control module is configured to interpret a clutch position, the engine speed, and an electromechanical device speed to provide the clutch actuation command.

13. The system of claim 10, further comprising an engine fueling module configured to interpret an engine start torque and provide an engine fueling command to increase the speed of the internal combustion engine to the second threshold speed after the friction clutch is disengaged when the engine speed has reached the first threshold speed.

14. The system of claim 10, wherein the electromechanical device is operable to satisfy the driver torque demand while slippingly engaging the friction clutch to rotate the engine with the engine starting torque from the electromechanical device.

15. The system of claim 10, wherein the second threshold speed is approximately equal to a speed of the electromechanical device.

16. The system of claim 10, wherein the internal combustion engine is a diesel engine and the electromechanical device is a motor/generator.

17. The system of claim 10, wherein:
the electrical device is operably coupled to an electrical energy storage device; and
the transmission is drivingly engaged to the electromechanical device with a drive shaft.

18. The system of claim 17, wherein the transmission is an automated manual transmission.

* * * * *